Figure 1:
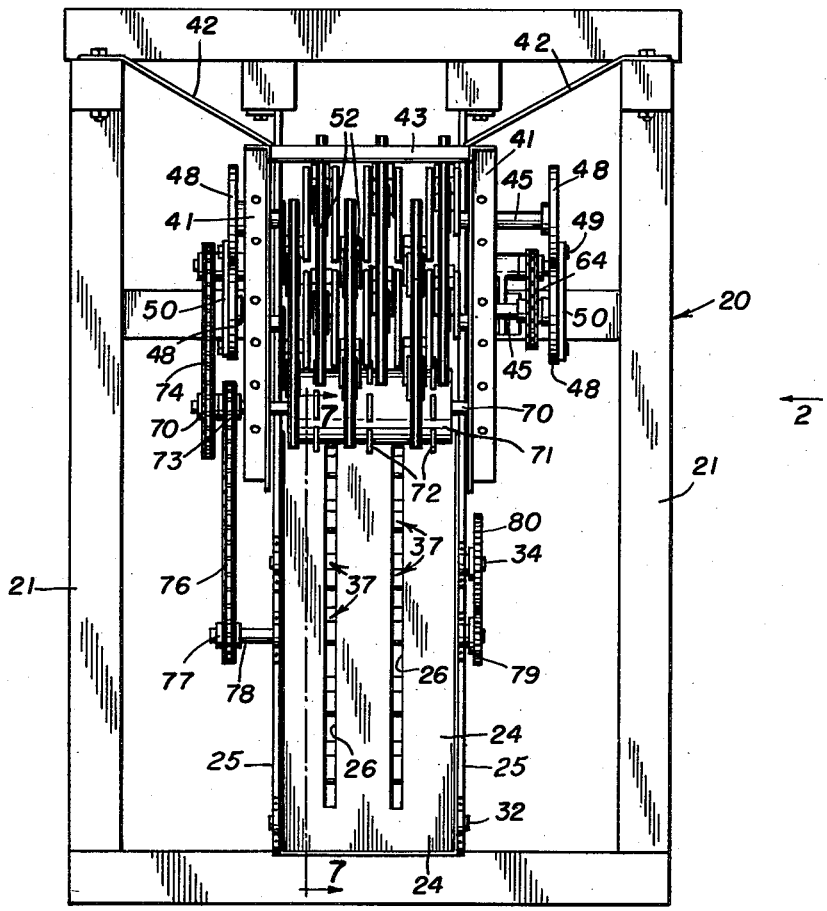

Sept. 23, 1952  C. L. KEY  2,611,370
VINE FEEDING ATTACHMENT FOR VINE THRESHERS
Filed May 15, 1947  3 Sheets-Sheet 1

Inventor
Claude L. Key

By *Clarence A. O'Brien
and Harvey B. Jacobson*
Attorneys

Sept. 23, 1952　　　　　　　C. L. KEY　　　　　　2,611,370
VINE FEEDING ATTACHMENT FOR VINE THRESHERS
Filed May 15, 1947　　　　　　　　　　　　　3 Sheets-Sheet 2
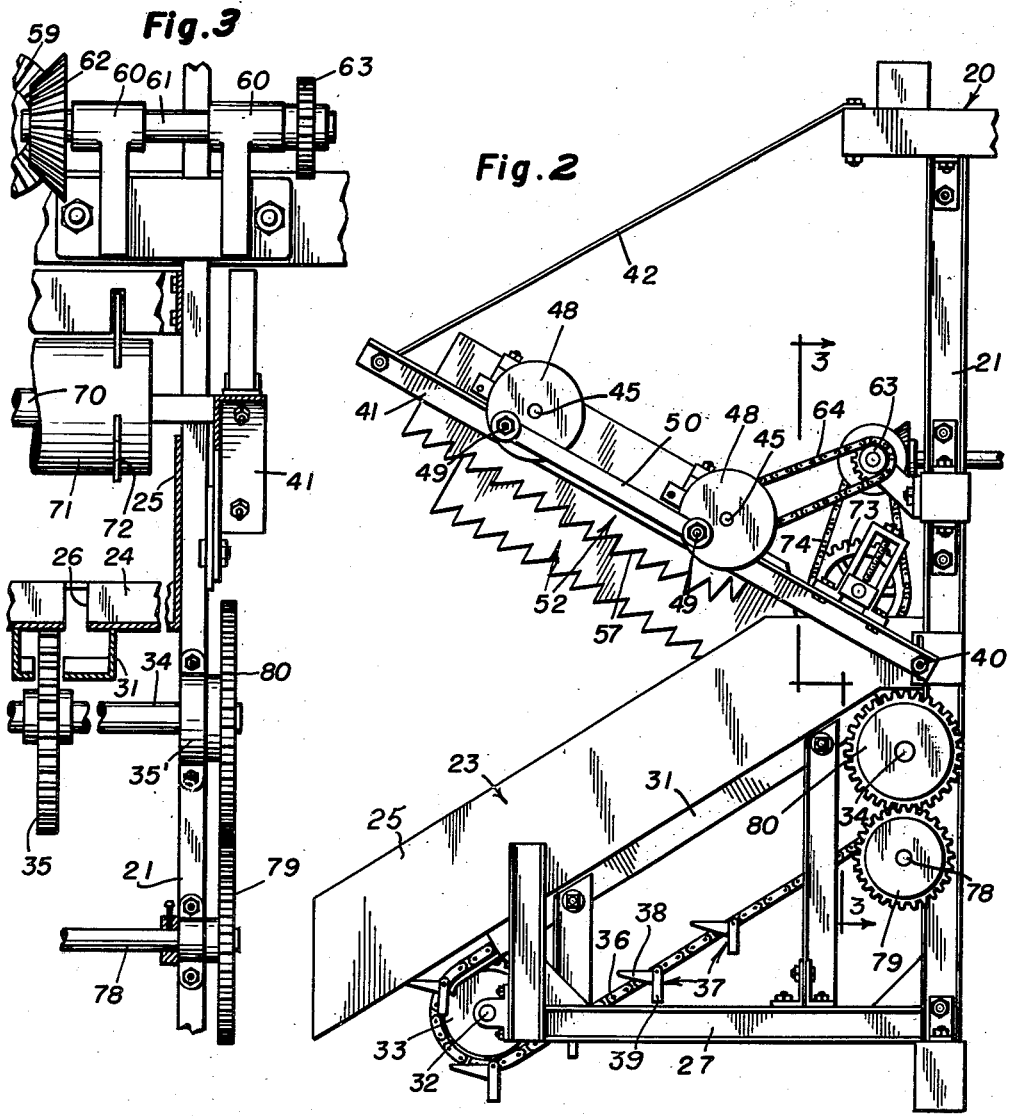
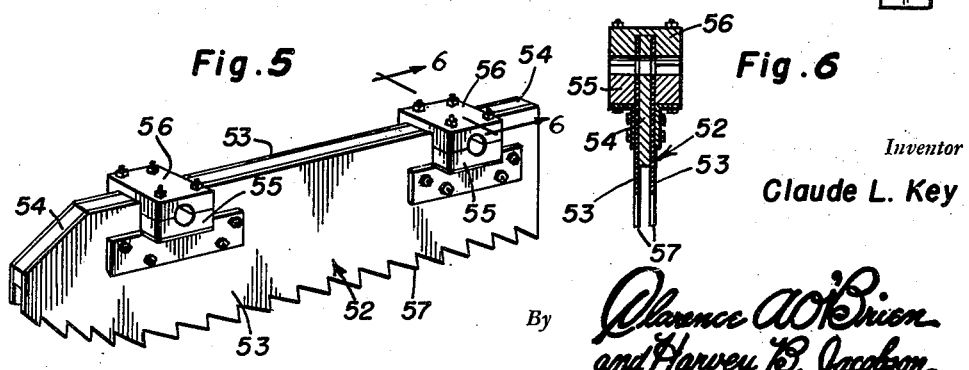
Inventor
Claude L. Key
By Clarence A. O'Brien
and Harvey B. Jackson
Attorneys Sept. 23, 1952          C. L. KEY          2,611,370
VINE FEEDING ATTACHMENT FOR VINE THRESHERS
Filed May 15, 1947          3 Sheets-Sheet 3

Inventor
Claude L. Key
By Clarence A. O'Brien
and Harvey B. Jacobson
Attorneys

Patented Sept. 23, 1952

2,611,370

UNITED STATES PATENT OFFICE 2,611,370

VINE FEEDING ATTACHMENT FOR VINE THRESHERS

Claude L. Key, Milton, Oreg.

Application May 15, 1947, Serial No. 748,279

3 Claims. (Cl. 130—1)

This invention relates to a vine feeding attachment for a vine thresher and has for its primary object to effect economies in the feeding of vines bearing beans, peas and like products into the mouth of a thresher.

Another object is to assure the uniform presentation of the vines bearing the peas, beans and the like to the mouth of the thresher and to avoid injury to the products of the vines.

The above and other objects may be attained by employing this invention which embodies among its features a plurality of rake bars each mounted above the conveyor of a vine thresher to move in a vertical plane which lies parallel with the longitudinal axis of the conveyor and means to move the rake bars and cause them to push away from the mouth of the thresher bunches of vines advanced by the conveyor.

Other features include means to move alternate rake bars in unison, in a direction to cause them to push away from the mouth of the thresher bunches of vines advanced by the conveyor.

Still other features include means to actuate the rake bars in timed relation with the conveyor.

Figure 4:
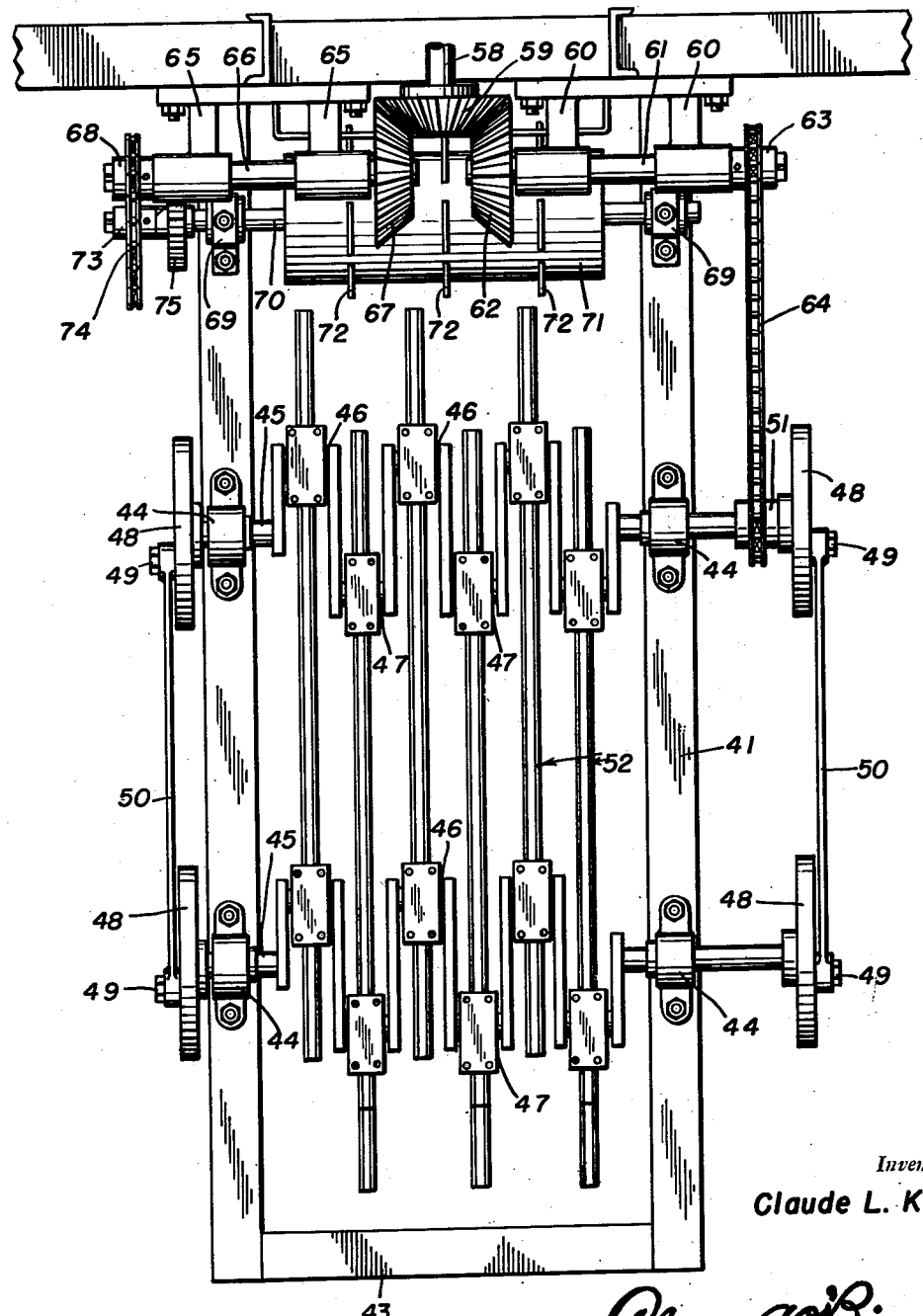

In the drawings:

Figure 1 is a front view in elevation of a vine feeder embodying the features of this invention showing the same in position on the frame of a vine thresher, Figure 2 is a side view of the vine feeder illustrated in Figure 1 and taken in the direction of arrow 2 in Figure 1, Figure 3 is an enlarged detail vertical sectional view taken substantially on the plane of section line 3—3 of Figure 2, Figure 4 is a plan view looking down on the top of the frame and rake bars supported thereby, Figure 5 is a perspective view of one of the rakes, and Figure 6 is a detail vertical sectional view taken substantially along the lines 6—6 of Figure 5.

Referring to the drawings in detail a vine thresher designated generally 20 includes a framework carrying at one end uprights 21 intermediate the upper and lower ends of which is located the mouth 22 of the vine thresher which extends transversely between the uprights in a conventional manner.

In order to advance the vines to be threshed into the mouth of the thresher a conveyor designated generally 23 is coupled with the thresher so that its delivery end is disposed at the mouth of the thresher, and vines moved by the conveyor will be presented to the mouth of the thresher for further handling by the threshing machine. In the form of conveyor employed in connection with this invention there is provided an elongated trough or chute comprising a bottom 24 from which extend perpendicularly along opposite sides vertical walls 25. The conveyor inclines upwardly with its upper delivery end disposed adjacent the mouth 22 of the thresher, and formed in the bottom wall 24 are elongated spaced parallel longitudinal slots 26, the purpose of which will be more fully hereinafter explained. The conveyor 23 is supported on a suitable framework 27 attached to the frame 21 of the thresher 20, and rising from the framework 27 are columns or pedestals 28, the upper ends of which are provided with inclined elongated slots 29 for the reception of attaching bolts 30 by which guide tracks 31 are adjustably secured to the columns 28 adjacent their upper ends. These guide tracks are supported immediately beneath the bottom 24 of the conveyor trough 23 and not only form supports for the upper runs of the conveyor chains to be more fully hereinafter described, but also serve to guide the vine advancing fingers carried by the chains as will be more fully hereinafter explained.

Mounted in suitable bearing brackets carried by the outer end of the frame 27 is a shaft 32 on which are mounted intermediate its ends spaced sprockets 33. A drive shaft 34 is journaled in suitable brackets 35' carried by the frame 21, and keyed to this shaft 34 for rotation in planes with the sprockets 33 are drive sprockets 35 of conveyor chains 36, the upper runs of which ride in the guides 31 previously referred to. Pivotally supported as at 37 to each chain and extending laterally therefrom is a vine pusher designated generally 37 comprising a pusher finger 38 which is adapted to project upwardly through a slot 26 in the bottom 24 of the conveyor 23, so that vines are deposited on the bottom 24, they will be advanced toward the mouth 22 of the vine thresher. It will be understood of course that there is a plurality of vine pushers 37 attached to each chain so that the vines will be continuously advanced toward the mouth of the thresher. Formed on each vine pusher 37 and extending at an angle from the finger 38 thereof is a tail piece 39 which as the pusher is advanced around its respective sprocket 33 contacts the end of the guide 31 adjacent its respective slot 26 so as to cause the finger 38 to be projected through the slot to engage vines lying on the bottom 24 of the conveyor 23. The conveyor thus described may be utilized to advance the vines to be threshed into the mouth 22 of the thresher in a conventional manner, and when so used requires the attendance of operators for the purpose of raking downwardly away from the mouth of the thresher bunches of vines which tend to pile upon the conveyor, and cause clogging of the mouth of the thresher and injury to the fruit of the vines.

In order to avoid the necessity of attendants to rake the vine bunches away from the mouth of the thresher, and to render the feeding of the vines into the thresher automatic, I provide the raking equipment to be more fully hereinafter described.

Supported as at 40 on the uprights or columns 21 of the frame 20 is a pair of spaced parallel bars 41 which extend upwardly from the mouth of the thresher, and divergent with relation to the conveyor 23. The ends of these bars 41 opposite to those connected to the columns or standards 21 are attached to suspension rods 42 which are attached to the frame 20 near the upper ends of the columns or standards 21 as will be readily understood upon reference to Figures 2 and 3. The ends of the bars 41 opposite those which are pivoted to the columns or standards 21 are held in spaced relation by a cross bar 43 to form a substantially U-shaped frame, and carried at longitudinally spaced points on each bar 41 are bearing blocks 44 in which crank shafts 45 are mounted to rotate about parallel axes extending transversely of the frame. Each crank shaft 45 is provided with a group of cranks 46 and a second group of cranks 47 in diametrically opposed relation to the cranks 46, and connected to opposite ends of the crank shafts are disks 48 to which are coupled at 49 connecting rods 50 by means of which the shafts 45 are caused to rotate in unison. A drive sprocket 51 is fixed to one of the crank shafts 45 to serve as a driving means for the crank shafts 45 which will be more fully hereinafter explained.

The cranks 46 and 47 of the crank shafts 45 serve as supports for the rake bars designated generally 52, each of which comprises a pair of spaced blades or plates 53 held in spaced parallel relation by filler blocks 54 (Figure 12) arranged between opposite ends of the blades 53. Fixed to the blades adjacent one side edge thereof and in spaced longitudinal relation are bearing halves 55, the upper portions of which are closed by bearing caps 56, and these bearing halves receive the cranks 46 and 47 of the crank shafts 45 so that the rake bars 52 will move in unison with the crank shafts in vertical planes which lie parallel with the longitudinal axis of the conveyor 23. The lower edge, i. e. that edge facing the conveyor 23 of each rake bar is serrated as at 57 to form saw teeth for engagement with the bunches of vines as they approach the mouth 22 of the thresher on the conveyor 23.

The vine thresher 20 is equipped with a longitudinally extending drive shaft 58, which projects slightly beyond the outer end of the frame 21, and fixed to the projecting end of the shaft 58 is a bevel pinion 59, which rotates in unison with the shaft 58. Mounted in suitable brackets 60 attached to the frame of the vine thresher 20 is a drive shaft 61 carrying at one end a bevel pinion 62 which meshes with the pinion 59, and carried at the opposite end of the shaft 61 is a sprocket 63 which has driving connection with the sprocket 51 through the medium of an endless chain 64. It will thus be seen that as the shaft 58 is rotated the crank shafts 45 will be driven to cause alternate rake bars 52 to move downwardly and outwardly toward the ends of the side bars 41, and to thus push bunches of vines advancing up the conveyor 23 away from the mouth of the vine thresher.

Mounted in suitable brackets 65 carried by the frame of the vine thresher 20 and lying in axial alignment with the shaft 61 is a drive shaft 66 to one end of which is fixed a bevel pinion 67 which meshes with the pinion 59 diametrically opposite the point at which the pinion 62 meshes therewith. Fixed to the outer end of the shaft 66 is a drive sprocket 68, the purpose of which will be more fully hereinafter explained.

Mounted for rotation in suitable journal bearings 69 carried on the bars 41 adjacent their ends remote from the cross bar 43 is a shaft 70 intermediate the ends of which is mounted a feed roll 71 carrying on its periphery vine feeding fingers which are adapted to engage the vines advanced by the conveyor 23 and introduce them into the mouth 22 of the vine thresher. Fixed to one end of the shaft 70 is a drive sprocket 73 which has driving connection with the drive sprocket 68 through the medium of an endless chain 74. A drive sprocket 75 is fixed to the shaft 70 adjacent the sprocket 73, and trained over this drive sprocket is an endless chain 76 which has driving connection with a sprocket 77 carried at one end of a jack shaft 78 which is mounted for rotation in suitable bearings carried by the standards 21 of the frame 20 below the shaft 34 of the conveyor 23. The end of the jack shaft 78 opposite that carrying the sprocket 77 has fixed thereto for rotation therewith a drive gear 79 which meshes with a drive gear 80 which is keyed or otherwise fixed to the drive shaft 34 of the conveyor 23.

In operation it will be understood that with the vine thresher functioning, the bevel pinion 59 will rotate in a clockwise direction when viewed from the mouth carrying end of the vine thresher. This will cause the pinions 62 and 67 to be rotated in the direction of the arrows in Figure 4, thus rotating the crank shafts 45 in such a manner that as the rake bars 52 descend they will move toward the feeding end of the conveyor 23, thus to push away from the mouth of the vine thresher bunches of vines advancing along the conveyor. Simultaneously with the driving of the shaft 61 the shaft 66 will rotate in the opposite direction, thus driving the feed roll 71 in a direction to cause the vines delivered thereto to enter the mouth of the vine thresher. Through the medium of the chain 76, jack shaft 78 and pinions 79 and 80 the conveyor chains 36 will be driven in a direction to cause fingers 38 to advance vines deposited on the conveyor upwardly toward the mouth of the vine thresher. It will thus be seen that vines may be placed in the conveyor 23 in any approved manner, and will be advanced toward the mouth of the vine thresher by the fingers 38 operating through the slots 26 in the bottom 24 of the conveyor trough. Any tendency for bunches of vines to enter the mouth of the vine thresher will be overcome by the movement of the rake bars 52 and the engagement of the teeth 57 thereof with the vine bunches. As a consequence a smooth uniform blanket of vines will be fed by the feed roll into the mouth of the vine thresher with the result that the operation of the thresher will be materially improved and injury to the fruit of the vines will be avoided.

While in the foregoing there has been shown and described the preferred embodiment of this invention it is to be understood that minor changes in the details of construction, combination and arrangement of parts may be resorted to without departing from the spirit and scope of the invention as claimed.

I claim:

1. A feeding attachment for a vine thresher, comprising a vertically inclined chute having means for attaching the upper end thereof to a thresher, a frame mountable on the mouth of a thresher over the upper end of the chute, a series of parallel plates carried by the frame and disposed in vertical planes and having lower edges provided with saw teeth, said saw teeth each including a substantially vertical surface opposed to the feed, means operatively connected to the plates to bodily gyrate in a vertical plane the entire plates in a direction that the lower portions thereof move opposite to direction of feed and alternate plates move out of phase, and a drag conveyor moving upwardly over the chute and toward said plates.

2. In a vine thresher including a mouth, a feeding means for the thresher comprising a vertically inclined chute having its upper end attached to the mouth, a frame supported on the mouth and over the upper end of the chute, a series of spaced parallel plates carried by the frame and disposed in vertical planes and having lower edges provided with saw teeth each of which includes a substantially vertical surface opposed to direction of the feed, means operatively connected to the plates to bodily gyrate in a vertical plane the entire plates in a direction that the lower portions thereof move opposite to direction of feed and alternate plates move out of phase, and a drag conveyor moving upwardly over the chute and toward said plates.

3. In a pea vine feeding conveyor for threshers including a vertically inclined chute and a drag conveyor moving upwardly over the chute, means for distributing bunches of vines advanced by the conveyor, said means comprising a frame supported above the upper end of chute, a series of spaced parallel plates carried by the frame and disposed in vertical planes and having their lower edges provided with longitudinally spaced saw teeth, said saw teeth each having a substantially vertical surface opposed to the direction of feed, means operatively connected to the plates to bodily gyrate the entire plates in a vertical plane and in a direction so that the lower portions of the plates move opposite to direction of feed and alternate plates move out of phase.

CLAUDE L. KEY.

REFERENCES CITED

The following references are of record in the file of this patent:

UNITED STATES PATENTS

| Number | Name | Date |
| --- | --- | --- |
| 310,671 | Gould | Jan. 13, 1885 |
| 373,944 | Phillips | Nov. 29, 1887 |
| 532,711 | Schmidt | Jan. 15, 1895 |
| 590,324 | Kime | Sept. 21, 1897 |
| 658,665 | Mahoney | Sept. 25, 1900 |
| 675,515 | Long | June 4, 1901 |
| 701,846 | Conner | June 10, 1902 |
| 702,164 | Swenson | June 10, 1902 |
| 901,674 | Bockelman | Oct. 20, 1908 |
| 1,109,062 | Harjes | Sept. 1, 1914 |
| 1,341,238 | Mason | May 25, 1920 |
| 1,402,251 | Raymond | Jan. 3, 1922 |